Nov. 11, 1958  W. C. DRISCOLL  2,859,732
DOG COLLAR
Filed Oct. 25, 1956  2 Sheets-Sheet 1
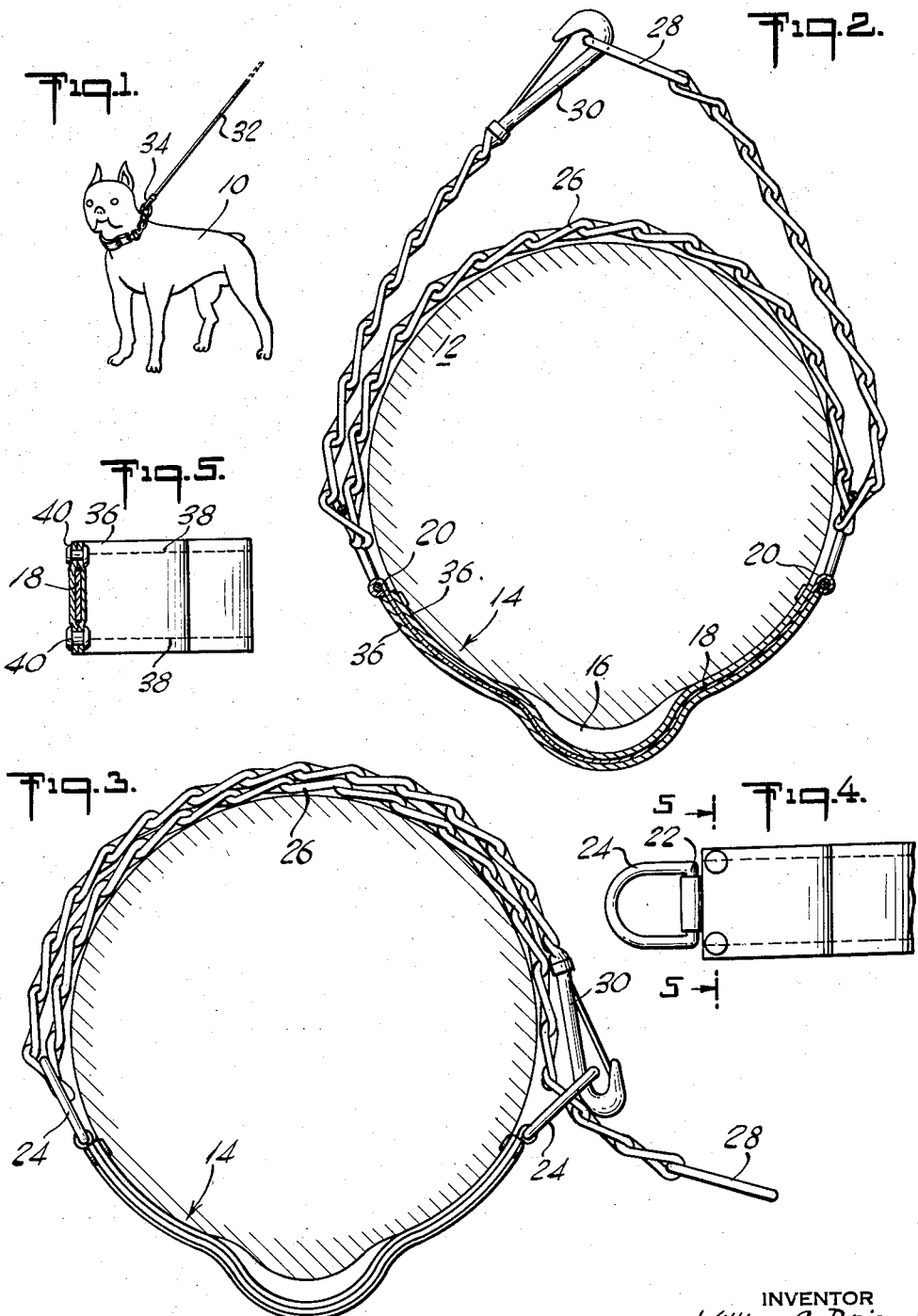
INVENTOR
William C. Driscoll
BY William R. Lieberman
ATTORNEY

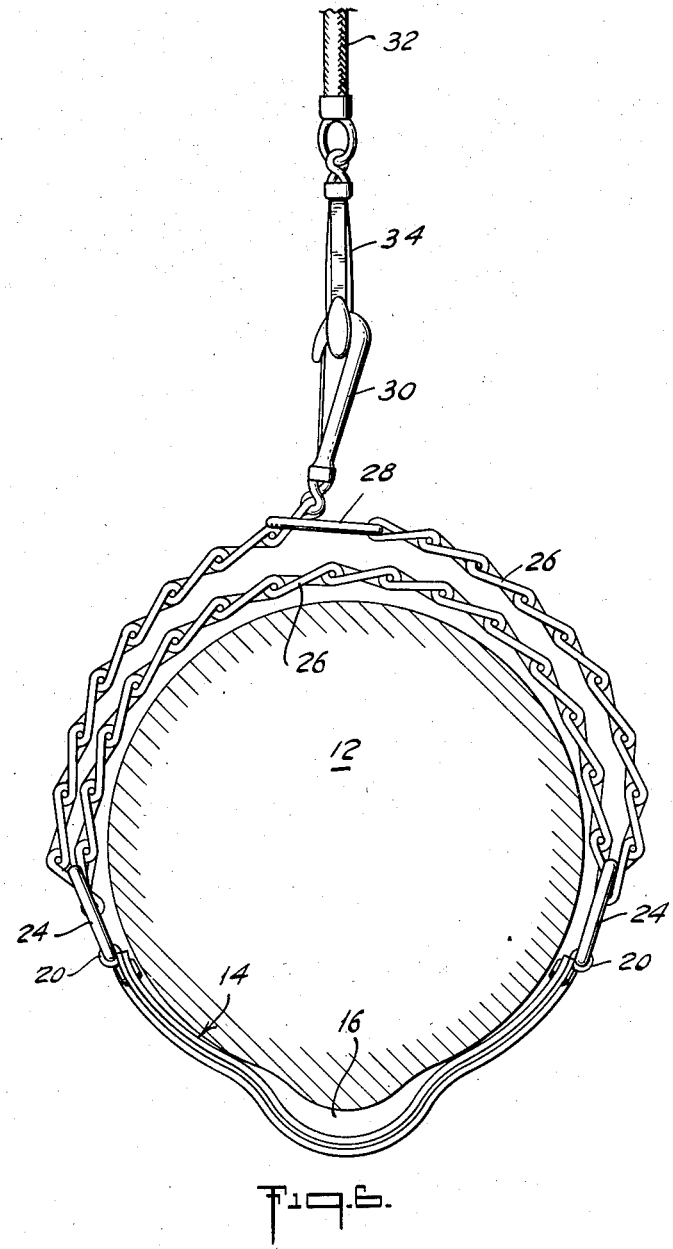

United States Patent Office 2,859,732
Patented Nov. 11, 1958

2,859,732
DOG COLLAR

William C. Driscoll, New Rochelle, N. Y.

Application October 25, 1956, Serial No. 618,350

3 Claims. (Cl. 119—106)

The present invention relates generally to an improved animal collar and in particular it relates to an improved dog collar provided with means for inhibiting the throttling of the animal.

The conventionally used dog collar consists of an adjustable flexible neckband formed of leather or the like and carrying a ring for releasably engaging a leash or other restraining device. By reason of the adjustability of the neckband the collar is often tightened to the great discomfort of the animal. Still a greater danger of throttling the animal, particularly when left alone. Very often, a dog or other animal is leashed to a post or a lead wire. Under these circumstances, it may find itself in a position where the collar presses against its wind pipe and the dog cannot extricate himself. As a result, the animal may be throttled.

It is thus a principal object of the present invention to provide an improved animal collar.

Another object of the present invention is to provide an improved animal collar provided with means for preventing the throttling of the animal.

Still another object of the present invention is to provide an improved animal collar characterized by its greater comfort and safety.

A further object of the present invention is to provide an improved animal restraining collar requiring the application of a minimum of pressure and characterized by its ability to prevent the throttling of the animal.

Still a further object of the present invention is to provide an improved dog collar of simple and attractive construction and characterized by its ability to prevent the throttling of the animal.

The above and other objects of the present invention will become apparent from a reading of the following description, taken in conjunction with the accompanying drawing, wherein Figure 1 is a perspective view of an animal wearing one form of the improved collar;

Figure 2 is an enlarged top plan view of an improved collar embodying the present invention;

Figure 3 is an enlarged top plan view of another form of the improved collar;

Figure 4 is an enlarged front detailed elevational view of a portion of the collar;

Figure 5 is an enlarged sectional view, taken along line 5—5 in Figure 4; and

Figure 6 is an enlarged top plan view of still another manner of employing the improved collar.

The present invention, in a sense, contemplates the provision of a safety animal collar comprising a front curved member adapted to engage the neck of an animal and having an inwardly directed recess formed therein adapted to register with the wind pipe on the neck of said animal, said front member being formed of a pliable resilient material, a pair of loop members located on opposite ends of said front member, an elongated flexible member slidably engaging said loop members and defining the rear collar portion, and means carried by said flexible member for the attachment of a leash.

Reference is now made to the drawing, and more particularly to Figures 1 through 4 thereof, wherein reference numeral 10 generally designates an animal such as a dog wearing a collar 12 constructed according to and embodying the present invention. The collar 12 includes a front section or member 14 which is generally of arcuate configuration substantially conforming to the contour of the neck of the animal 10. In order to accommodate the wind pipe of the animal a rearwardly directed recess 16 is formed in the collar front member 14, the recess 16 registering with the wind pipe to prevent any throttling pressure being applied to the wind pipe.

In the preferred form the collar member 14 is formed of an intermediate strip 18 of metal or other suitable preferably pliable resilient material having the properties of being able to be reformed upon the application of a moderately heavy force but being resilient when moderately light bending forces are applied thereto. As a result, the member 14 may be bent either manually or with the use of simple tools to vary its curvature so as to comfortably fit the neck of the animal and yet will not permanently distort upon the application of moderate forces but will resiliently return to its original configuration. A semi-soft steel is highly suited for the strip 18.

The ends of the strip 18 are rolled over to form transversely extending sleeves 20 which define the opposite ends of the arcuate front member 14. Engaging each of the sleeves 20 is a shank 22 of a heavy wire loop 24. A flexible member 26 in the form of a link chain passes through each of the loops 24, one end of the chain carrying a ring 28 and the other end of the chain carrying a snap hook 30 which releasably engages the ring 28. The intermediate portion of the flexible member 26 extending between the loops 24 assumes the shape of the rear of the neck of the animal and defines the back portion of the collar. A leash 32 of any desirable construction is provided with a snap hook 34 which releasably engages the ring 28.

In order to prevent the chafing of the animal's neck by the strip 18 and to increase the comforture of the collar a pair of strips 36 of a suitably soft material such as leather sandwiches the band 18 and extends beyond the upper and lower edges thereof. The borders of the strips 36 are connected by lines of stitching 38 and the corners are connected by suitable rivets 40.

As the collar is worn by the animal the recess 16 registers with the animal's wind pipe and the flexible member is drawn so that the collar assumes a snug fit on the neck of the animal. In the event that it is desired to restrain the animal the leash is merely pulled and pressure is applied to the sides and back of the neck of the animal in an amount controllable by the degree of pull on the leash. However, by reason of the recess 16 no pressure is applied to the wind pipe of the animal thus preventing throttling. Although the distribution of pressure on the neck of the animal as a consequence of pulling on the leash results in a minimum of discomforture to the animal compatible with animal training and does not throttle the animal, it is unexpectedly effective in controlling the animal's behavior. As a result, when the collar is applied to a dog, the dog rapidly learns to exert a minimum of pull on the leash.

In Figure 3 of the drawing there is illustrated another arrangement of the flexible members 26 and the front member 14 which members are identical in structure to the corresponding members described in connection with the collar illustrated in Figure 2. In the present embodiment, however, the snap hook 30 engages one of the loops 24 and the flexible member 26 extends from the snap hook 30 through the opposite loop 24 and then returns and passes through the first loop 24 and terminates in the ring 28.

The manner of employing the improved collar, as illustrated in Figure 6 of the drawing, offers many advantages. Principal among these is that the pressure applied to the neck of the animal, as related to the pull on the leash, is greatly increased by reason of the mechanical advantage resulting from the illustrated arrangement. The various components and their structure are similar to those previously described and require no further explanation. However, the chain 26 passes through the loops 24 carried by the front member 14 and the end of the chain 26 carrying the snap hook 30 passes through the ring 28 and extends rearwardly from the collar. The leash 32 is attached to the snap hook 30. It is apparent from the above that a mechanical advantage is gained from the leash to the collar by reason of the described arrangement. Moreover, the danger of throttling the animal is absent as in the previous embodiments. This is highly desirable in dog-training where sharp jerks on the leash are sometimes necessary to control fractious or stubborn dogs. The dog can be trained much more easily since there is eliminated the fear of throttling which is prevalent with present collars and choke chains.

While there has been described and illustrated a preferred embodiment of the present invention, it is apparent that numerous alterations and omissions may be made without departing from the spirit thereof.

The present patent application is a continuation-in-part of the copending patent application of William C. Driscoll, Serial No. 545,620 filed November 8, 1955, now abandoned.

I claim:

1. A safety animal collar comprising a front curved member adapted to engage the neck of an animal and having an inwardly directed recess formed therein adapted to register with the wind pipe section of the neck of said animal, said front member being formed of a pliable resilient material, a pair of loop members located on opposite ends of said front member, an elongated flexible member slidably engaging said loop members and defining the rear collar portion, opposite portions of said flexible member being releasably interengaged and an element carried by said flexible member for the attachment of a leash.

2. A safety animal collar in accordance with claim 1, wherein said flexible member passes through said loops and has its opposite ends releasably secured one to the other.

3. A safety animal collar in accordance with claim 1, wherein said leash attaching element is secured to one end of said flexible member, said end slidably registering with a ring carried on the other end thereof.

References Cited in the file of this patent

UNITED STATES PATENTS

| 770,070 | Johnson | Sept. 13, 1904 |
| 2,614,533 | Elsinger | Oct. 21, 1952 |

FOREIGN PATENTS

| 168,534 | Great Britain | Sept. 8, 1921 |